R. J. TREEN.
WHEEL FOR ROAD VEHICLES.
APPLICATION FILED MAR. 6, 1920.
1,363,975.
Patented Dec. 28, 1920.
3 SHEETS—SHEET 1.
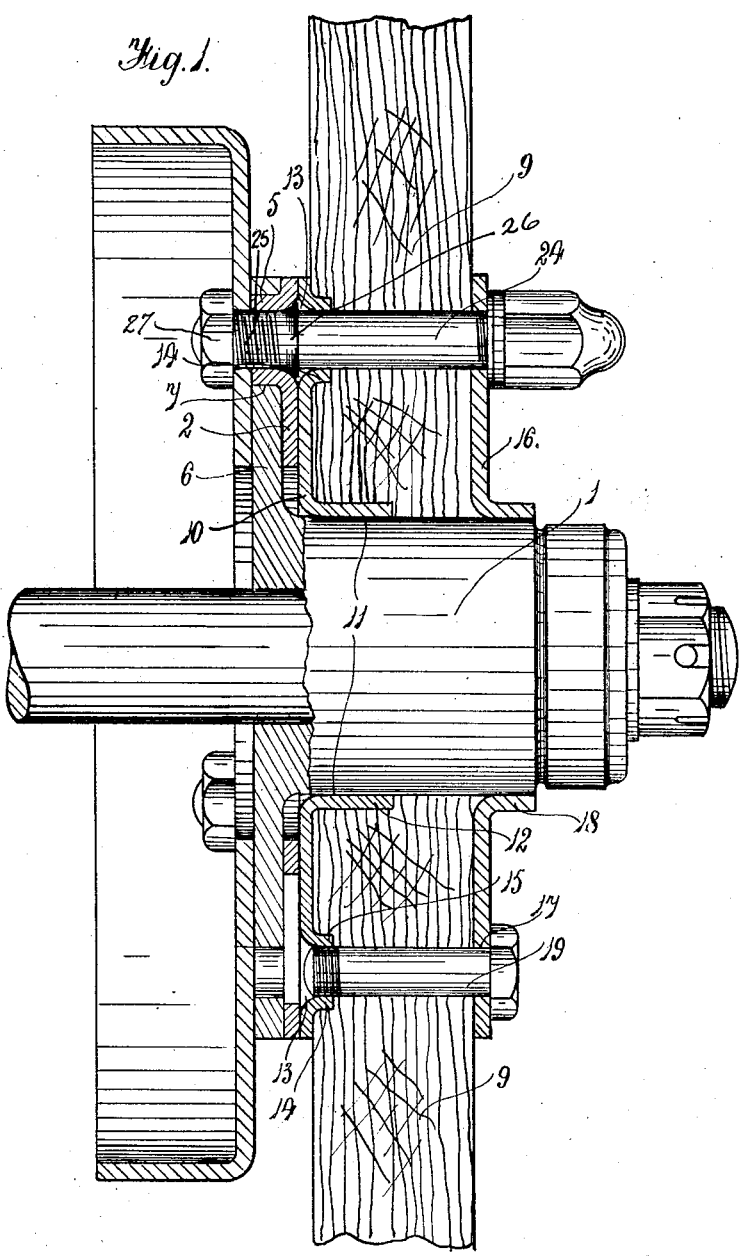

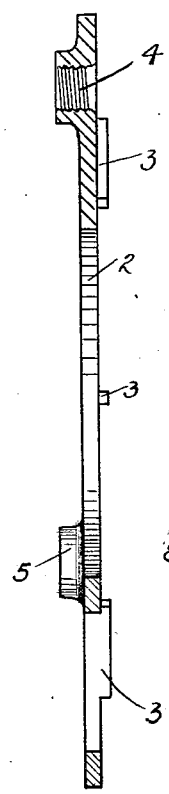
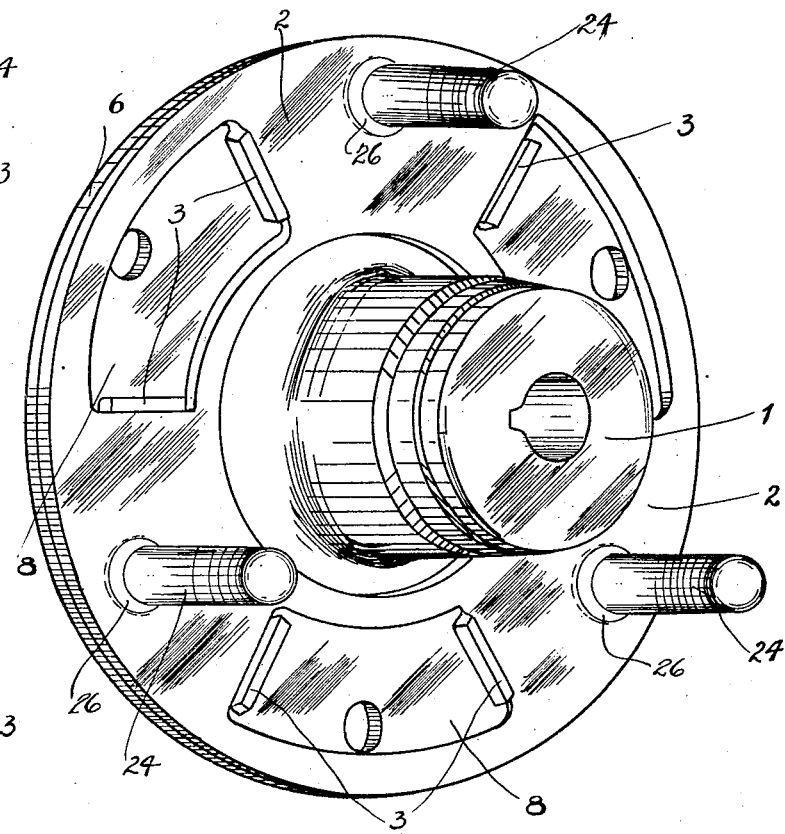

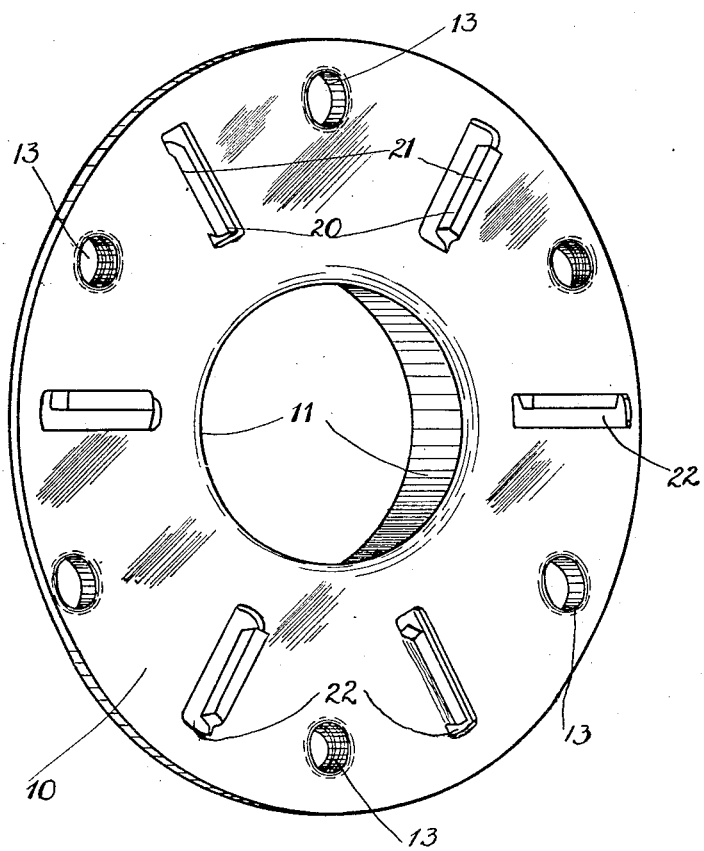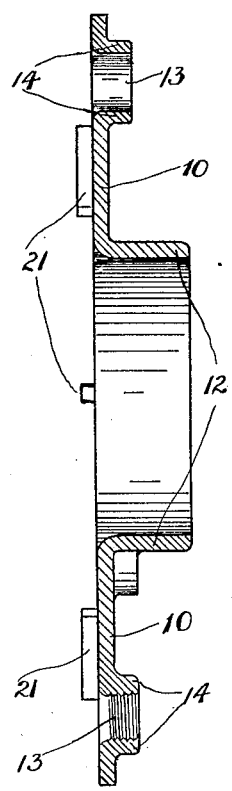

UNITED STATES PATENT OFFICE.

ROLAND JAMES TREEN, OF BIRMINGHAM, ENGLAND.

WHEEL FOR ROAD-VEHICLES.

1,363,975.  Specification of Letters Patent.  Patented Dec. 28, 1920.

Application filed March 6, 1920. Serial No. 363,776.

*To all whom it may concern:*

Be it known that I, ROLAND JAMES TREEN, a subject of the King of Great Britain, residing at "Glasbury," 53 Prospect road, Moseley, Birmingham, in the county of Warwick, England, have invented certain new and useful Improvements in Wheels for Road-Vehicles; and I do hereby declare the following to be a full, clear, and exact description of the same.

This invention relates to wheels for road vehicles, and has for its object to provide an improved means for attaching such wheels to the axles or hubs which they support.

It is common practice to attach the road wheels of vehicles to their axles or hubs by means of axially disposed bolts passing through a flange upon the hub or axle and through a flange or flanges upon the road wheel. This construction has the disadvantage that the drive is transmitted from the axle to the wheel through the bolts thus placing considerable shearing stress upon said bolts. Under such stresses the bolts are liable to become disturbed so as to render the removal of the wheel a matter of difficulty. By the use of my invention those portions of the bolts upon which the wheel is mounted are relieved of this shearing stress.

According to the present invention the inner side of the wheel of a vehicle is provided with a flanged plate provided with inter-engaging means upon both sides, those on one side adapted to form a driving engagement with complementary inter-engaging means in the hub flange face or in a plate securely attached thereto, and those upon the other side being adapted to form driving engagement with complementary inter-engaging means in the wheel or in a plate securely attached thereto.

Referring to the drawings:—

Figure 1 is a sectional view in end elevation showing a wheel constructed in accordance with my invention.

Fig. 2 is a perspective view of the hub driving plate shown in position on the hub.

Fig. 3 is a view in sectional end elevation of the hub driving plate.

Figs. 4 and 5 are views in perspective and sectional end elevation respectively of the wheel driving plate.

In the construction illustrated I provide the hub 1 with an adapter or driving plate 2. This driving plate is annular in form, and is provided with a number say six radial projections 3 which may be turned or bent up out of the plate. This adapter or driving plate 2 is provided with bolt holes 4 which are provided with bosses 5 made in one with the plate, which bosses project from the plate and from the opposite side to that having the radial projections 3. The bosses 5 of these bolt holes are adapted to enter holes 7 in the hub flange face 6, while the radial projections 3 project outwardly toward the end of the axle. The driving plate 2 is secured upon the hub plate by means of the bolt 24, the threaded end 25 of which screws into the hole 4 of the plate. The bolt is provided with an annular abutment 26 which engages the outer face of the plate 2, the abutment being counter-sunk in relation to the plate when the bolt is in position. A nut 27 is provided screwing on the end 25 to secure the whole. In the construction illustrated the brake drum is also secured by the nut 27. Between each pair of projections 3 is a hole 8.

The inner side of the wheel 9 is provided with a flanged plate 10 having a central opening 11 allowing the wheel to be placed on to the hub 1. The central opening 11 of this flanged plate is provided with a projecting boss 12 which enters the hole at the center of the wheel. This flanged plate 10 is also provided with bolt holes 13, some of which register with the bolt holes 4 provided in the adapter or driving plate 2. The bolt holes in the flanged plate 10 are also preferably provided with projecting bosses 14 which are adapted to enter holes 15 provided in the wheel 9.

The plate 10 is provided with projections 21 pressed up out of holes 22 corresponding in number and position to the projections 3 provided on plate 2.

On the outside of the wheel is preferably provided a second flanged plate 16 provided with bolt holes 17 corresponding to the bolt holes in the flanged plate 10. This flanged plate 16 is also provided with a central opening adapted to enable it to slip over the hub, and said opening is also preferably provided with an outwardly disposed projecting boss 18.

The two flanged plates 10 and 16 upon the wheel are preferably provided as shown with a greater number of bolt holes than are provided in the adapter or driving plate upon the hub. Certain of the bolt holes in the flanged plates 10 and 16 upon the wheel are used for bolting said flanges to the wheel, the bolts 19 either having counter sunk heads or screwed ends 20 whereby they can be attached to one plate 10 without projecting therefrom.

The wheel 9 with the two flanged plates 10 and 16 securely attached thereto is placed on the hub 1 with the radial projections 3 upon the adapter or driving plate 2 in driving engagement with radial slots 22 provided in the plate 10 of the wheel, and the projections 21 engaging in the holes 8 in the plate 2 and the wheel 9 is then secured to the hub 1 by securing bolts 24 which pass through the holes provided in the hub flange 6, the driving plate 2, and the two flanged plates 10 and 16 upon the wheel.

Each of the projections 3 and 21 engages with the thickness of the adjacent plate 2 or 10.

By this arrangement the drive is transmitted from the hub flange 6 to the driving plate 2 to a great extent through the projecting bosses 5 of the bolt holes. The drive is transmitted from the driving plate 2 to the inner flange plate 10 of the wheel through the projections 3 and 21 upon the driving plate 2 and plate 10 and the corresponding slots 8 and 22 in the two plates 2 and 10. The drive is finally transmitted from the inner flange plate 10 of the wheel 9 to the wheel itself to a great extent through the medium of the projecting bosses 14 of the bolt holes upon the inner flange plate 10.

It will thus be seen that the axially disposed bolts 24 are securing bolts and that no severe shear stress will be placed upon them.

As the adapter or driving plate 2 herein described can be readily secured to existing hubs, my invention provides a means whereby a vehicle having fixed wheels can be converted into a vehicle with detachable wheels.

If desired the present invention may be used in conjunction with that forming the subject of my prior British Patent No. 123,945.

What I claim then is:—

1. In a mounting for vehicle wheels the combination with a hub flange, holes in said flange, an annular hub plate adjacent said flange, holes in said plate registering with the holes in the flange, laterally projecting abutments on said plate upon the side thereof remote from said flange, an annular wheel plate mounted adjacent said hub plate and having openings in said wheel plate to receive said abutments, holes in said wheel plate registering with the holes in the hub plate, projections upon said wheel plate upon the side remote from the hub plate, said projections being adapted for engagement with recesses in a wheel, and securing members passing through said holes parallel to the axis serving also to retain the abutments on the hub plate within the openings in the wheel plate whereby the drive is transmitted through the said abutments.

2. In a mounting for vehicle wheels the combination with a hub flange, holes in said flange, an annular hub plate adjacent said flange, holes in said plate registering with the holes in the flange, bosses on one side of said hub plate engaging the holes in the hub flange, laterally projecting abutments on said plate upon the side thereof remote from said flange, openings in said plate between said projections, an annular wheel plate mounted adjacent said hub plate and having openings in said wheel plate to receive said abutments, projections on one side of said wheel plate entering the openings in the hub plate, holes in said wheel plate registering with the holes in the hub plate, bosses upon said wheel plate upon the side remote from the hub plate, said bosses being adapted for engagement with recesses in a wheel, and securing members passing through said holes parallel to the axis serving also to retain the abutments on the hub plate within the openings in the wheel plate whereby the drive is transmitted through the said abutments.

3. In a mounting for vehicle wheels the combination with a hub flange, holes in said flange, an annular hub plate adjacent said flange, holes in said plate registering with the holes in the flange, bosses on one side of said hub plate engaging the holes in the hub flange, integral abutments projecting laterally of said plate upon the side thereof remote from said flange, openings in said plate between said abutments, an annular wheel plate mounted adjacent said hub plate and having openings to receive said abutments, integral abutments projecting laterally on one side of said wheel plate entering the openings in the hub plate, holes in said wheel plate registering with the holes in the hub plate, bosses upon said wheel plate upon the side remote from the hub plate, said bosses being adapted for engagement with recesses in a wheel, and securing members passing through said holes parallel to the axis serving also to retain the abutments on the hub plate within the openings on the wheel plate, whereby the drive is transmitted through the said abutments.

4. In a mounting for vehicle wheels the combination with a hub flange, holes in said flange, an annular hub plate adjacent said flange, holes in said plate registering with the holes in the flange, projections on said plate upon the side thereof remote from said flange, an annular wheel plate mounted adjacent said hub plate and having openings to receive said projections, holes in said wheel plate registering with the holes in the hub plate, projections upon said wheel plate upon the side remote from the hub plate, said projections being adapted for engagement with recesses in a wheel, and securing members passing through said holes parallel to the axis, some of which securing members secure the wheel flange to the wheel and others of which secure the hub flange, wheel flange and wheel together.

5. In a mounting for vehicle wheels the combination with a hub flange, holes in said flange, an annular hub plate adjacent said flange, holes in said plate registering with the holes in the flange, bosses on one side of said hub plate engaging the holes in the hub flange, radial projections on said plate upon the side thereof remote from said flange, openings in said plate between said projections, an annular wheel plate mounted adjacent said hub plate and having openings to receive said projections, radial projections on one side of said wheel plate entering the openings in the hub plate, holes in said wheel plate registering with the holes in the hub plate, bosses upon said wheel plate upon the side remote from the hub plate, said bosses being adapted for engagement with recesses in a wheel, and securing members passing through said holes parallel to the axis.

6. In a mounting for vehicle wheels the combination of a hub flange, holes in said flange, an annular hub plate adjacent said flange, holes in said plate registering with the holes in the flange, bosses on one side of said hub plate engaging the holes in the hub flange, radial projections on said plate upon the side thereof remote from said flange, openings in said plate between said projections, an annular wheel plate mounted adjacent said hub plate and having openings to receive said projections, radial projections on one side of said wheel plate entering the openings in the hub plate, holes in said wheel plate registering with the holes in the hub plate, bosses upon said wheel plate upon the side remote from the hub plate, said bosses being adapted for engagement with recesses in a wheel, and securing members passing through said holes parallel to the axis, some of which securing members secure the wheel flange to the wheel and others of which secure the hub flange, wheel flange and wheel together.

In testimony whereof I affix my signature.
ROLAND JAMES TREEN.